US011056944B2

(12) United States Patent
Suwazono (10) Patent No.: US 11,056,944 B2
(45) Date of Patent: Jul. 6, 2021

(54) STATOR OF ROTARY MACHINE

(71) Applicant: MEIDENSHA CORPORATION, Tokyo (JP)

(72) Inventor: Takeshi Suwazono, Yamanashi (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/954,264

(22) PCT Filed: Nov. 16, 2018

(86) PCT No.: PCT/JP2018/042406
§ 371 (c)(1),
(2) Date: Jun. 16, 2020

(87) PCT Pub. No.: WO2019/130893
PCT Pub. Date: Jul. 4, 2019

(65) Prior Publication Data
US 2020/0395805 A1 Dec. 17, 2020

(30) Foreign Application Priority Data
Dec. 25, 2017 (JP) .............................. JP2017-247241

(51) Int. Cl.
*H02K 3/28* (2006.01)
*H02K 1/16* (2006.01)

(52) U.S. Cl.
CPC ................. *H02K 3/28* (2013.01); *H02K 1/16* (2013.01)

(58) Field of Classification Search
CPC ............... H02K 3/28; H02K 1/16; H02K 3/12
(Continued)

(56) References Cited

U.S. PATENT DOCUMENTS

2003/0230949 A1* 12/2003 Ogawa ................... H02K 3/505
310/180
2010/0213782 A1* 8/2010 Nashiki .................... H02K 3/28
310/195
(Continued)

FOREIGN PATENT DOCUMENTS

JP 08-205444 A 8/1996
JP 2004-23808 A 1/2004
(Continued)

OTHER PUBLICATIONS

Extended European Search Report, Application No. 18894629.7, dated Dec. 17, 2020, 9 pages.

*Primary Examiner* — Alex W Mok
(74) *Attorney, Agent, or Firm* — Foley & Lardner LLP (57) ABSTRACT

In order to provide a rotary machine's stator that is capable of reducing the size of the coil ends and using a plurality of voltages without changing the winding arrangement, it is made to include a stator core (12) having a plurality of slots (14) provided along the circumferential direction, segments (22) that are composed of rectangular wires and received in the slots (14), and a distributed winding wire that is formed by arranging unit coils (21), each of which is made up of a plurality of the segments (22) disposed along the radial direction, in the circumferential direction of the stator core (12), and is made to form the unit coil (21) by connecting the segments (22) that are alternately and concentrically arranged in the radial direction with a plurality of slot pitches that are different from each other.

9 Claims, 6 Drawing Sheets

(58) Field of Classification Search
USPC .......................................................... 310/208
See application file for complete search history.

(56) References Cited

U.S. PATENT DOCUMENTS

| | | | | |
|---|---|---|---|---|
| 2012/0161569 A1* | 6/2012 | Hisada | ............... | H02K 15/0081 |
| | | | | 310/201 |
| 2013/0187510 A1* | 7/2013 | Takiguchi | ................ | H02K 3/12 |
| | | | | 310/207 |
| 2014/0125187 A1* | 5/2014 | Suzuki | .................... | H02K 3/12 |
| | | | | 310/202 |
| 2015/0091408 A1* | 4/2015 | Azusawa | ................ | H02K 3/28 |
| | | | | 310/208 |
| 2015/0207374 A1* | 7/2015 | Tsuiki | ..................... | H02K 3/12 |
| | | | | 310/202 |
| 2015/0381000 A1* | 12/2015 | Tamura | ................... | H02K 3/28 |
| | | | | 310/207 |
| 2016/0056679 A1* | 2/2016 | Sakaue | .................... | H02K 3/12 |
| | | | | 310/198 |
| 2016/0241099 A1* | 8/2016 | Ren | .................... | H02K 15/0068 |
| 2016/0268860 A1* | 9/2016 | Tsuiki | ..................... | H02K 3/12 |
| 2016/0322876 A1* | 11/2016 | Horii | ........................ | H02K 3/14 |
| 2016/0336826 A1* | 11/2016 | Ichikawa | ................. | H02K 3/12 |
| 2017/0025907 A1* | 1/2017 | Iki | ............................. | H02K 3/12 |
| 2017/0054339 A1* | 2/2017 | Harakawa | .............. | H02K 1/146 |
| 2017/0237310 A1* | 8/2017 | Nakamura | ............... | H02K 3/28 |
| | | | | 310/195 |
| 2017/0256996 A1* | 9/2017 | Nakamura | ............... | H02K 1/16 |

FOREIGN PATENT DOCUMENTS

| | | |
|---|---|---|
| JP | 2007-151393 A | 6/2007 |
| JP | 2012-16195 A | 1/2012 |
| JP | 2012-222962 A | 11/2012 |
| JP | 2016-13031 A | 1/2016 |
| WO | WO 2014/184951 A1 | 11/2014 |
| WO | WO 2017/110949 A1 | 6/2017 |

* cited by examiner

STATOR OF ROTARY MACHINE

TECHNICAL FIELD

The present invention relates to a stator of a rotary machine.

BACKGROUND ART

The following Patent Publication 1 discloses a rotary machine for high-voltage vehicles, with a sequentially joined-segment stator coil, which enables to adjacently position a plurality of the same phase slots and to achieve the voltage increase of the rotary machine by increasing the number of turns while suppressing accompanying adverse effects, by providing a plurality of the same phase, adjacent slots and providing special segments and special U-phase segments, which are different from normal segments (9 slot pitch) as segments and have slot pitches different from each other.

Figure 7:
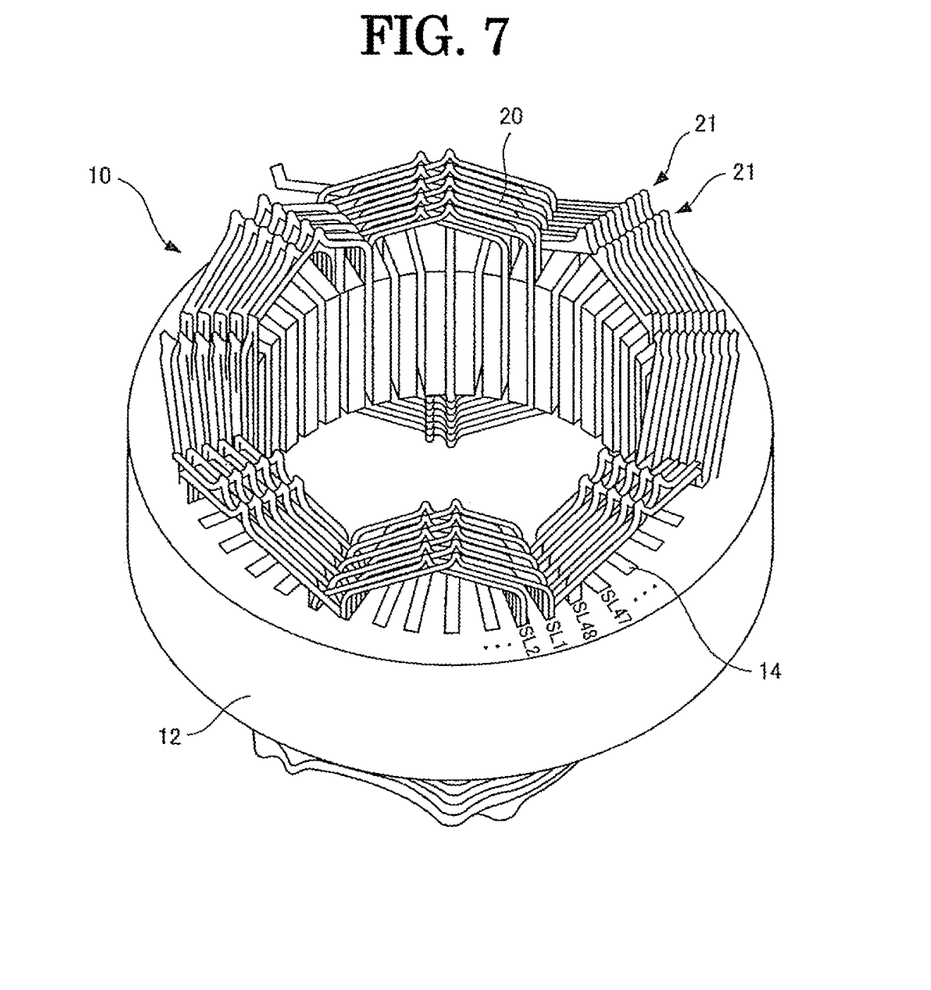
FIG. 7 is a view showing a condition in which one phase distributed winding coil is wound in a conventional rotary machine stator.

Furthermore, as shown in FIG. 7, the following Patent Publication 2 discloses that, in a rotary electric machine stator 10 composed of a stator core 12 prepared by stacking a plurality of annular electromagnetic steel plates and three-phase winding wires 20 to be wound about the stator core 12, a winding wire of each phase is composed by combining 16 unit coils 21 each being formed by winding a coil wire element into a generally hexagonal shape, and that, in slots 14 as grooves which are opened on the annular inner peripheral side of the stator core 12, extend in the radial direction, and are arranged by a plural number in the circumferential direction, the second unit coil 21 is disposed to be right adjacent to the first unit coil 21, and then the third, the fourth, the fifth, . . . , the 14th and the 15th are disposed to be adjacent in sequence to make two rounds in the circumferential direction to result in the 16th unit coil 21. In this composition, the first unit coil 21 and the ninth unit coil 21 are partly overlapped to be displaced by one slot. Similarly, suppose that the coil number is i, the ith coil and the (i+1)th coil are partly overlappingly disposed to be displaced by one slot.

In FIG. 7, only U-phase winding wire 20 as one phase part of the three-phase winding wire is shown. In an example shown in FIG. 7, the slots 14 are disposed in the circumferential direction of the stator core 12 by the number of 48 (SL1 to SL48). In sixteen of these, the U-phase winding wire is disposed.

PRIOR ART PUBLICATIONS

Patent Publications

Patent Publication 1: JP Patent Application Publication 2004-23808 Patent Publication 2: JP Patent Application Publication 2012-16195

SUMMARY OF THE INVENTION

Task to be Solved by the Invention

Here, in the segment disposition of the above-mentioned Patent Publication 1, in the case of changing the terminal voltage, it becomes necessary to reconsider the winding wire arrangement. Thus, there has been a problem that the terminal voltage cannot be changed easily.

Furthermore, in the above-mentioned Patent Publication 2, the unit coils are composed of a coil wire element of the same form. Therefore, there has been a problem that it is difficult to make the coil ends small.

In view of this, it is an object of the present invention to provide a rotary machine stator in which the coil ends can be made smaller and which is adaptable to a plurality of voltage specifications by changing the connection method without changing the winding wire disposition.

Mean for Solving the Task

A stator of a rotary machine according to the first invention for solving the above task comprises:
 a stator core having a plurality of slots provided along a circumferential direction;
 segments that are composed of rectangular wires and received in the slots; and
 a distributed winding wire that is formed by arranging unit coils, each of which is made up of a plurality of the segments disposed along a radial direction, in the circumferential direction of the stator core,
 wherein the unit coil is formed by connecting the segments that are alternately and concentrically arranged in the radial direction with a plurality of slot pitches that are different from each other.

The stator of the rotary machine according to the second invention for solving the above task is characterized in that the unit coils are arranged by a number of 2n (where n is a natural number of 1 or greater) in the circumferential direction of the stator core,
 that the distributed winding wire is such that the unit coil at a start of a winding is determined as a first coil and that the unit coil at an end of the winding is determined as a 2nth coil,
 that two of the slots for receiving the segments constituting the first coil are identical with two of the slots for receiving the segments constituting each of an nth coil, an (n+1)th coil and the 2nth coil,
 that other two of the slots for receiving the segments constituting the first coil are identical with two of the slots for receiving the segments constituting each of the a second coil, the (n+1)th coil, and a (n+2)th coil,
 that two of the slots for receiving the segments constituting a (1+2i)th coil (where i is a natural number from 1 to (n/2−1)) are identical with two of the slots for receiving the segments constituting each of a 2ith coil, an (n+2i)th coil, and an (n+1+2i)th coil,
 that other two of the slots for receiving the segments constituting the (1+2i)th coil are identical with two of the slots for receiving the segments constituting each of a (2+2i)th coil, the (n+1+2i)th coil, and an (n+2+2i)th coil.

The stator of the rotary machine according to the third invention for solving the above task is characterized in that the segments include a first segment having a first slot pitch and a second segment having a second slot pitch that is greater than the first slot pitch,
 that the unit coil is formed by alternately and concentrically arranging the first segment and the second segment in the radial direction,
 that the slot for receiving a phase terminal side of the first segment constituting the first coil is identical with the slot for receiving a phase terminal side of each of the second segment constituting the nth coil, the first segment constituting the (n+1)th coil, and the second segment constituting the 2nth coil,
 that the slot for receiving a phase terminal side of the second segment constituting the first coil is identical with the slot for receiving a phase terminal side of each of the first segment constituting the nth coil, the second segment constituting the (n+1)th coil, and the first segment constituting the 2nth coil, that the slot for receiving a neutral point side of the first segment constituting the first coil is identical with the slot for receiving a neutral point side of each of the second segment constituting the second coil, the first segment constituting the (n+1)th coil, and the second segment constituting the (n+2)th coil, that the slot for receiving a neutral point side of the second segment constituting the first coil is identical with the slot for receiving a neutral point side of each of the first segment constituting the second coil, the second segment constituting the (n+1)th coil, and the first segment constituting the (n+2)th coil, that the slot for receiving a phase terminal side of the first segment constituting the (1+2i)th coil is identical with the slot for receiving a phase terminal side of each of the second segment constituting the 2ith coil, the first segment constituting the (n+1+2i)th coil, and the second segment constituting the (n+2i)th coil, that the slot for receiving a terminal phase side of the second segment constituting the (1+2i)th coil is identical with the slot for receiving a phase terminal side of each of the first segment constituting the 2ith coil, the second segment constituting the (n+1+2i)th coil, and the first segment constituting the (n+2i)th coil, that the slot for receiving a neutral point side of the first segment constituting the (1+2i)th coil is identical with the slot for receiving a neutral point side of each of the second segment constituting the (2+2i)th coil, the first segment constituting the (n+1+2i)th coil, and the second segment constituting the (n+2+2i)th coil, that the slot for receiving a neutral point side of the second segment constituting the (1+2i)th coil is identical with the slot for receiving a neutral point side of each of the first segment constituting the (2+2i)th coil, the second segment constituting the (n+1+2i)th coil, and the first segment constituting the (n+2+2i)th coil.

The stator of the rotary machine according to the fourth invention for solving the above task is characterized in that unit winding wires of each phase, each unit winding wire being prepared by connecting in series the unit coils by a number of n in the circumferential direction of the stator core, are connected in series.

The stator of the rotary machine according to the fifth invention for solving the above task is characterized in that unit winding wires of each phase, each unit winding wire being prepared by connecting in series the unit coils by a number of n/2 in the circumferential direction of the stator core, are connected in parallel.

The stator of the rotary machine according to the sixth invention for solving the above task is characterized in that the segment is formed into a hairpin shape by bending both ends of a single rectangular wire, and both ends are inserted into the slots that are different from each other, and that a tip end portion of one of the segments that is bent to project from the stator core is connected to the tip end portion or a phase terminal or a neutral point of another of the segments.

Advantageous Effect of the Invention

In accordance with the stator of the rotary machine according to the present invention, the unit coil is formed by alternately and concentrically arranging the segments in the radial direction with a plurality of slot pitches different from each other. This makes it possible to arrange another segment on the inner side in the axial direction of one segment. As compared with conventional unit coils, it is possible to form a unit coil by making the segments dense. This makes it possible to decrease the coil end size. Furthermore, in the case of directly cooling the coil ends with liquid, it becomes possible to sufficiently spread coolant throughout the coil ends due to making the segments dense, thereby improving the cooling effect. Furthermore, it becomes possible to select series wiring or parallel wiring by changing the unit coil's connection relation to be formed by the segment arrangement, even if the segment arrangement is the same. In addition, even in the case of making it into parallel wiring, it is possible to prevent the occurrence of circulating current.

MODE FOR IMPLEMENTING THE INVENTION

In the following, the stator of the rotary machine according to the present invention is explained with reference to the drawings.

Embodiments

Using FIG. 1 to FIG. 6, the stator of the electric machine according to one embodiment of the present invention is explained in detail. The structure of the stator of the rotary machine according to the present embodiment is generally similar to the above-mentioned rotary machine stator 10 shown in FIG. 7 except each phase winding wire arrangement. Therefore, in the following explanation, members showing functions similar to the above-mentioned members shown in FIG. 7 are designated by the same signs, and the repetitive explanations are omitted.

Figure 1:
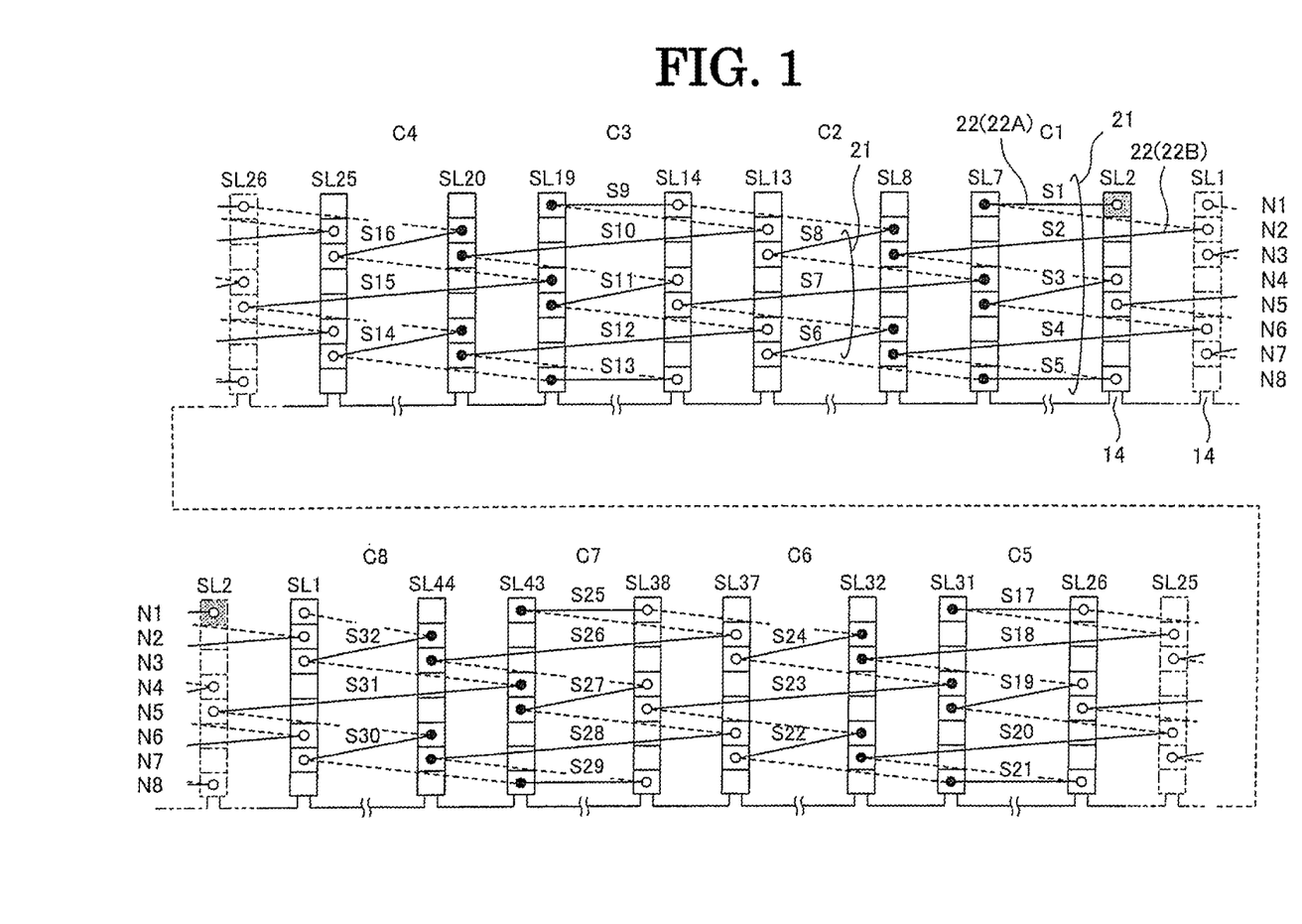
FIG. 1 is an explanatory view showing a U1 phase segments arrangement example in the case of connecting a partial winding wire in series in the stator of the rotary machine according to an embodiment of the present invention.
Figure 2:
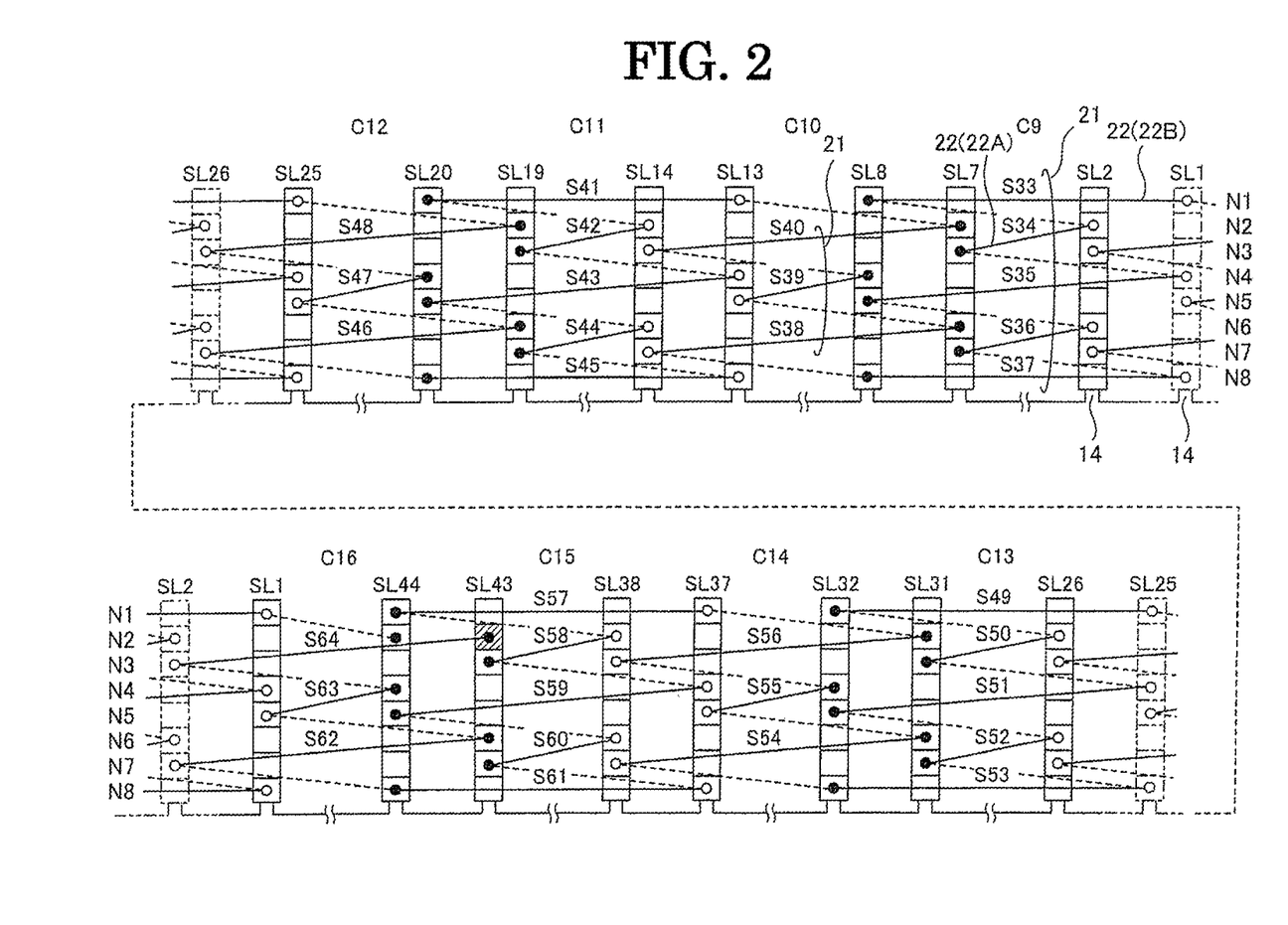
FIG. 2 is an explanatory view showing a U2 phase segments arrangement example in the case of connecting a partial winding wire in series in the stator of the rotary machine according to an embodiment of the present invention.
Figure 3:
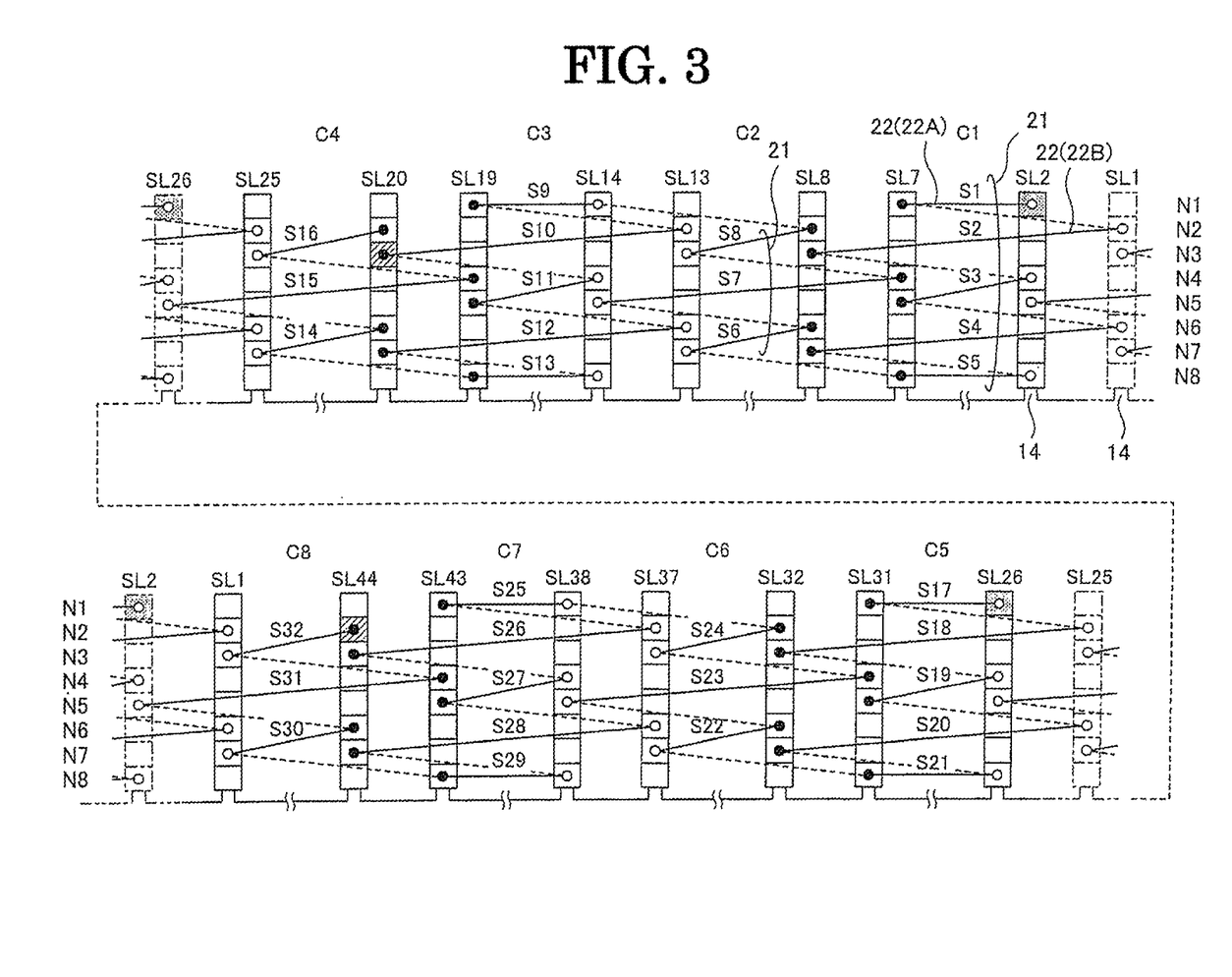
FIG. 3 is an explanatory view showing U1 phase and U2 phase segments arrangement example in the case of connecting a partial winding wire in parallel in the stator of the rotary machine according to an embodiment of the present invention.
Figure 4:
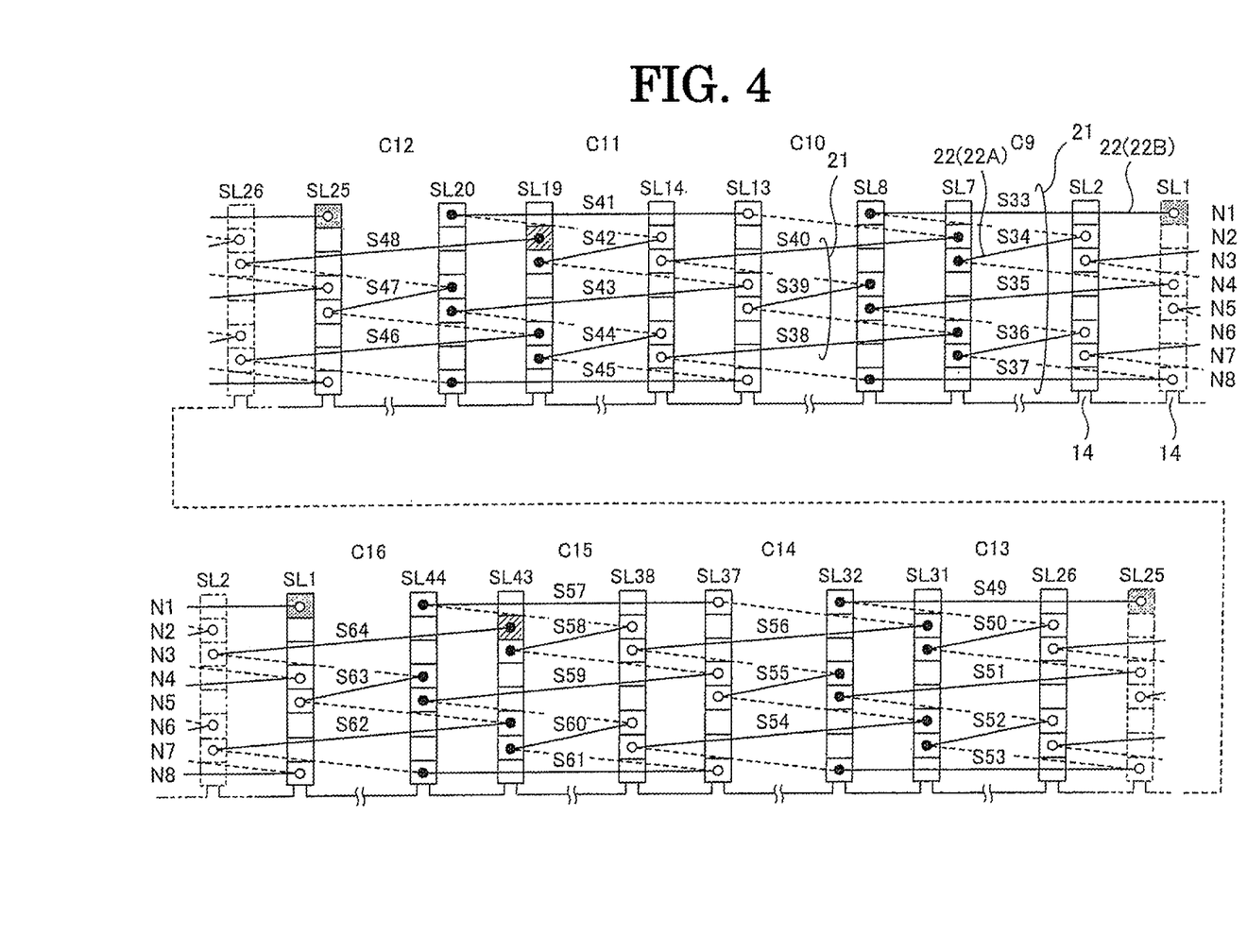
FIG. 4 is an explanatory view showing U3 phase and U4 phase segments arrangement example in the case of connecting a partial winding wire in parallel in the stator of the rotary machine according to an embodiment of the present invention.

FIG. 1 and FIG. 2 show a segments 22 arrangement example in the case of constituting U-phase winding by connecting U1 phase and U2 phase as partial windings in series. FIG. 1 shows U1 phase arrangement, and FIG. 2 shows U2 phase arrangement. Furthermore, FIG. 3 and FIG. 4 show a segments 22 arrangement example in the case of constituting U-phase winding by connecting U1 phase to U4 phase as partial windings in parallel. FIG. 3 shows an arrangement of U1 phase and U2 phase. FIG. 4 shows an arrangement of U3 phase and U4 phase. With respect to V-phase winding and W-phase winding, they have configurations generally similar to U-phase winding except in that their positions in the circumferential direction of the slots 14 for inserting the segments 22 are different. Therefore, their detailed explanations are omitted.

In the present embodiment, one prepared by forming into a hairpin shape by bending both sides of a single conductor wire element (rectangular wire) is used as segment 22. Both ends of this segment 22 are respectively inserted into different slots 14. A part (hereinafter tip end portion) of segment 22 projecting from the stator core 12 is bent and then connected to the tip end portion of another segment 22 projecting from the stator core 12, U-phase terminal or neutral point N, etc.

In FIG. 1 to FIG. 4, a head side of each segment is shown by a solid line, and a leg side (connection side) of each segment is shown by a broken line. In FIG. 1 to FIG. 4, Sa is a symbol for identifying segment 22, and a=1, 2, . . . , 64 in the order to be connected. For example, the first segment 22 is denoted by S1. Furthermore, SLb is a symbol for identifying slot 14, and b=1, 2, . . . , 48 (see FIG. 7) in the order along the circumferential direction. For example, the first slot 14 is denoted by SL1. Furthermore, Nc is a symbol (conductor number) for identifying the position where the segment 22 is received (inserted) in slot 14, and c=1, 2, . . . , 8 in the order from the radial outside. Furthermore, Cd is a symbol for identifying unit coil 21 composed of a plurality of segments 22 that are concentrically wound, and d=1, 2, . . . , 16 in the order to be connected. For example, the first unit coil 21 is denoted by C1. Unit coil 21 is disposed by the number of 2n (where n is a natural number of 1 or greater, and n=8 in the present embodiment) in the circumferential direction of the stator core 12.

Furthermore, in FIG. 1 to FIG. 4, white circle indicates the U-phase terminal side of segment 22, and black circle indicates the neutral point N (see FIGS. 5 and 6) of segment 22. Furthermore, the position of slot 14 at which the segment 22 to be connected to the U-phase terminal is received is dotted, and the position of slot 14 at which the segment 22 to be connected to neutral point N has slash lines.

As shown in FIG. 1 to FIG. 4, the unit coil 21 in the present embodiment is constituted by alternately and concentrically disposing two types of segments 22 (first segment 22A and second segment 22B) in the radial direction. First segment 22A is formed in a manner that both ends are inserted into slots 14 with a 5-slots pitch. Second segment 22B is formed in a manner that both ends are inserted into slots 14 with a 7-slots pitch.

More specifically, as shown in FIG. 1 and FIG. 3, suppose that j is a natural number from 0 to (n/2−1) (in the present embodiment, j=0, 1, 2, 3), the (1+2j)th unit coil 21 is composed of five segments 22 of (1+8j)th, (2+8j)th, (3+8j)th, (4+8j)th, and (5+8j)th ones.

The (1+8j)th segment 22 is the first segment 22A, wherein its U-phase terminal side is received at a position of the conductor number N1 of the (2+12)th slot 14, and wherein its neutral point side is received at a position of the conductor number N1 of the (7+12j)th slot 14. The (2+8j)th segment 22 is the second segment 22B, wherein its U-phase terminal side is received at a position of the conductor number N2 of the (1+12j)th slot 14, and wherein its neutral point side is received at a position of the conductor number N3 of the (8+12j)th slot 14. The (3+8j)th segment 22 is the first segment 22A, wherein its U-phase terminal side is received at a position of the conductor number N4 of the (2+12j)th slot 14, and wherein its neutral point side is received at a position of the conductor number N5 of the (7+12j)th slot 14. The (4+8j)th segment 22 is the second segment 22B, wherein its U-phase terminal side is received at a position of the conductor number N6 of the (1+12j)th slot 14, and wherein its neutral point side is received at a position of the conductor number N7 of the (8+12j)th slot 14. The (5+8j)th segment 22 is the first segment 22A, wherein its U-phase terminal side is received at a position of the conductor number N8 of the (2+12j)th slot 14, and wherein its neutral point side is received at a position of the conductor number N8 of the (7+12j)th slot 14.

In the (1+2j)th unit coil 21, as shown by broken lines in the drawing, the neutral point side of the (1+8j)th segment 22 and the U-phase terminal side of the (2+8j)th segment are connected, the neutral point side of the (2+8j)th segment 22 and the U-phase terminal side of the (3+8j)th segment are connected, the neutral point side of the (3+8j)th segment 22 and the U-phase terminal side of the (4+8)th segment are connected, and the neutral point side of the (4+8j)th segment 22 and the U-phase terminal side of the (5+8j)th segment are connected.

Furthermore, the (2+2j)th unit coil is composed of three segments 22 of the (6+8j)th, the (7+8j)th, and the (8+8j)th ones.

The (6+8j)th segment 22 is the first segment 22A, wherein its U-phase terminal side is received at a position of the conductor number N7 of the (13+12j)th slot 14, and wherein its neutral point side is received at a position of the conductor number N6 of the (8+12j)th slot 14. The (7+8j)th segment 22 is the second segment 22B, wherein its U-phase terminal side is received at a position of the conductor number N5 of the (14+12j)th slot 14, and wherein its neutral point side is received at a position of the conductor number N4 of the (7+12j)th slot 14. The (8+8j)th segment 22 is the first segment 22A, wherein its U-phase terminal side is received at a position of the conductor number N3 of the (13+12j)th slot 14, and wherein its neutral point side is received at a position of the conductor number N2 of the (8+12j)th slot 14.

In the (2+2j)th unit coil 21, as shown by broken lines in the drawing, the neutral point side of the (6+8j)th segment 22 and the U-phase terminal side of the (7+8j)th segment 22 are connected, and the neutral point side of the (7+8j)th segment 22 and the U-phase terminal side of the (8+8j)th segment 22 are connected.

However, in the eighth unit coil 21, the $30^{th}$ segment 22 is the first segment 22A, wherein its U-phase terminal side is received at a position of the conductor number N7 of the first slot 14, and wherein its neutral point side is received at a position of the conductor number N6 of the 44th slot 14. The $31^{st}$ segment 22 is the second segment 22B, wherein its U-phase terminal side is received at a position of the conductor number N5 of the second slot 14, and wherein its neutral point side is received at a position of the conductor number N4 of the $43^{rd}$ slot 14. The $32^{nd}$ segment 22 is the first segment 22A, wherein its U-phase terminal side is received at a position of the conductor number N3 of the first slot 14, and wherein its neutral point side is received at a position of the conductor number N2 of the 44th slot 14.

Furthermore, as shown in FIG. 2 and FIG. 4, suppose that j=0, 1, 2, . . . , (n/2−1) (in the present embodiment, j=0, 1, 2, 3), the (9+2j)th unit coil 21 is composed of five segments 22 of (33+8j)th, (34+8j)th, (35+8j)th, (36+8j)th, and (37+8j)th ones.

The (33+8j)th segment 22 is the second segment 22B, wherein its U-phase terminal side is received at a position of the conductor number N1 of the (1+12j)th slot 14, and wherein its neutral point side is received at a position of the conductor number N1 of the (8+12j)th slot 14. The (34+8j)th segment 22 is the first segment 22A, wherein its U-phase terminal side is received at a position of the conductor number N2 of the (2+12j)th slot 14, and wherein its neutral point side is received at a position of the conductor number N3 of the (7+12j)th slot 14. The (35+8j)th segment 22 is the second segment 22B, wherein its U-phase terminal side is received at a position of the conductor number N4 of the (1+12j)th slot 14, and wherein its neutral point side is received at a position of the conductor number N5 of the (8+12j)th slot 14. The (36+8j)th segment 22 is the first segment 22A, wherein its U-phase terminal side is received at a position of the conductor number N6 of the (2+12j)th slot 14, and wherein its neutral point side is received at a position of the conductor number N7 of the (7+12j)th slot 14. The (37+8j)th segment 22 is the second segment 22B, wherein its U-phase terminal side is received at a position of the conductor number N8 of the (1+12j)th slot 14, and wherein its neutral point side is received at a position of the conductor number N8 of the (8+12j)th slot 14.

Furthermore, the (10+2j)th unit coil is composed of three segments 22 of the (38+8j)th, the (39+8j)th, and the (40+8)th ones.

The (38+8j)th segment 22 is the second segment 22B, wherein its U-phase terminal side is received at a position of the conductor number N7 of the (14+12j)th slot 14, and wherein its neutral point side is received at a position of the conductor number N6 of the (7+12j)th slot 14. The (39+8j)th segment 22 is the first segment 22A, wherein its U-phase terminal side is received at a position of the conductor number N5 of the (13+12j)th slot 14, and wherein its neutral point side is received at a position of the conductor number N4 of the (8+12j)th slot 14. The (40+8j)th segment 22 is the second segment 22B, wherein its U-phase terminal side is received at a position of the conductor number N3 of the (14+12j)th slot 14, and wherein its neutral point side is received at a position of the conductor number N2 of the (7+12j)th slot 14.

However, in the 16th unit coil 21, the $62^{nd}$ segment 22 is the second segment 22B, wherein its U-phase terminal side is received at a position of the conductor number N7 of the second slot 14, and wherein its neutral point side is received at a position of the conductor number N6 of the $43^{rd}$ slot 14. The $63^{rd}$ segment 22 is the first segment 22A, wherein its U-phase terminal side is received at a position of the conductor number N5 of the first slot 14, and wherein its neutral point side is received at a position of the conductor number N4 of the 44th slot 14. The $64^{th}$ segment 22 is the second segment 22B, wherein its U-phase terminal side is received at a position of the conductor number N3 of the second slot 14, and wherein its neutral point side is received at a position of the conductor number N2 of the $43^{rd}$ slot 14.

That is, in the present embodiment, in each unit coil 21, the segments 22 (22A and 22B) having two slot pitches are concentrically disposed at slots 14. This results in a condition in which the segments 22 constituting one unit coil 21 are received in four slots 14.

Then, the slot 14 for receiving each phase's terminal side (hereinafter, phase terminal side) of the first segments 22A constituting the first unit coil 21 is the same as the slot 14 for receiving the phase terminal sides of the second segment 22B of the nth unit coil 21 that is adjacent to one side of the first unit coil, of the first segments 22A of the (n+1)th unit coil 21, and of the second segments 22B of the 2nth unit coil 21 that is adjacent to one side of the (n+1)th unit coil 21.

Furthermore, the slot 14 for receiving the phase terminal sides of the second segments 22B constituting the first unit coil 21 is the same as the slot 14 for receiving the phase terminal sides of the first segments 22A of the nth unit coil that is adjacent to one side of the first unit coil 21, of the second segments 22B of the (n+1)th unit coil, and of the first segment 22A of the 2nth unit coil 21 that is adjacent to one side of the (n+1)th unit coil 21.

Furthermore, the slot 14 for receiving the neutral point sides of the first segments 22A constituting the first unit coil 21 is the same as the slot 14 for receiving the neutral point sides of the second segment 22B of the second unit coil 21 that is adjacent to the other side of the first unit coil 21, of the first segments 22A of the (n+1)th unit coil 21, and of the second segments 22B of the (n+2)th unit coil 21 that is adjacent to the other side of the (n+1)th unit coil 21.

Furthermore, the slot 14 for receiving the neutral sides of the second segments 22B constituting the first unit coil 21 is the same as the slot 14 for receiving the neutral point sides of the first segments 22A of the second unit coil 21 that is adjacent to the other side of the first unit coil 21, of the second segments 22B of the (n+1)th unit coil 21, and of the first segment 22A of the (n+2)th unit coil 21 that is adjacent to the other side of the (n+1)th unit coil 21.

Furthermore, the slot 14 for receiving the each phase's terminal sides (hereinafter phase terminal sides) of the first segments 22A constituting the (1+2i)th unit coil 21 (wherein i is a natural number from 1 to (n/2−1)) is the same as the slot 14 for receiving the phase terminal sides of the second segment 22B of the 2ith unit coil 21 that is adjacent to one side of the (1+2i)th unit coil, of the first segments 22A of the (n+1+2i)th unit coil 21, and of the second segments 22B of the (n+2i)th unit coil 21 that is adjacent to one side of the (n+1+2i)th unit coil.

Furthermore, the slot 14 for receiving the phase terminal sides of the second segments 22B constituting the (1+2i)th unit coil 21 is the same as the slot 14 for receiving the phase terminal sides of the first segments 22A of the 2ith unit coil 21 that is adjacent to one side of the (1+2i)th unit coil 21, of the second segments 22B of the (n+1+2i)th unit coil 21, and of the first segment 22A of the (n+2i)th unit coil 21 that is adjacent to one side of the (n+1+2i)th unit coil.

Furthermore, the slot 14 for receiving the neutral point sides of the first segments 22A constituting the (1+2i)th unit coil is the same as the slot 14 for receiving the neutral point sides of the second segment 22B of the (2+2i)th unit coil 21 that is adjacent to the other side of the (1+2i)th unit coil, of the first segments 22A of the (n+1+2i)th unit coil 21, and of the second segments 22B of the (n+2+2i)th unit coil 21 that is adjacent to the other side of the (n+1+2i)th unit coil 21.

Furthermore, the slot 14 for receiving the neutral point sides of the second segments 22B constituting the (1+2i)th unit coil 21 is the same as the slot for receiving the neutral point sides of the first segments 22A of the (2+2i)th unit coil 21 that is adjacent to the other side of the (1+2i)th unit coil 21, of the second segments 22B of the (n+1+2i)th unit coil 21, and of the first segment 22A of the (n+2+2i)th unit coil 21 that is adjacent to the other side of the (n+1+2i)th unit coil 21.

In such rotary machine's stator of the present embodiment, as shown in FIG. 1 and FIG. 2, U1 phase winding wire is prepared by connecting the first to eighth unit coils 21 in series that are prepared by respectively connecting the neutral point sides of the fifth, eighth, 13$^{th}$, 16$^{th}$, 21$^{st}$, 24$^{th}$, 29$^{th}$ segments 22 and the U-phase terminal sides of the 6$^{th}$, 9$^{th}$, 14$^{th}$, 17$^{th}$, 22$^{nd}$, 25$^{th}$, and 30$^{th}$ segments. U2 phase winding wire is prepared by connecting the ninth to 16th unit coils 21 in series that are prepared by respectively connecting the neutral point sides of the 37$^{th}$, 40$^{th}$, 45$^{th}$, 48$^{th}$, 53$^{rd}$, 56$^{th}$, and 61$^{st}$ segments 22 and the U-phase terminal sides of the 38$^{th}$, 41$^{st}$, 46$^{th}$, 49$^{th}$, 54$^{th}$, 57$^{th}$, and 62$^{nd}$ segments 22. It is possible to prepare a U-phase winding wire, in which U1 phase winding wire and U2 phase winding wire are connected in series, by connecting a leg portion on the neutral point side of the 32$^{nd}$ segment 22 and a leg portion on the U-phase terminal side of the 33$^{rd}$ segment 22.

Figure 5:
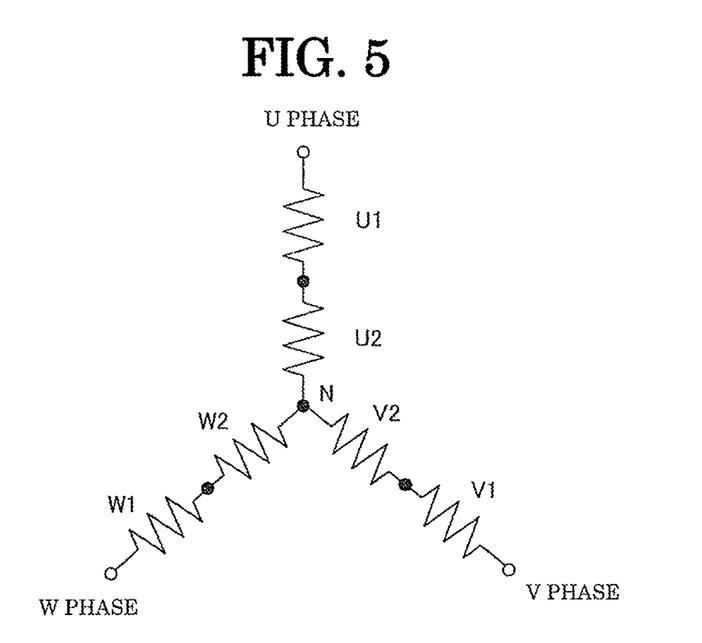
FIG. 5 is a connection diagram in the case of connecting the partial winding wire of each phase in series.

Similarly, as shown in FIG. 5, a V-phase winding wire is prepared by connecting V1 phase winding wire and V2 phase winding wire in series, and a W-phase winding wire is prepared by connecting W1 phase winding wire and W2 phase winding wire. It is possible to form the stator coil into a series winding wire structure by a Y connection of the U-phase winding wire, the V-phase winding wire, and the W-phase winding wire.

Furthermore, as shown in FIG. 3 and FIG. 4, U1 phase winding wire is prepared by connecting the first to fourth unit coils 21 in series that are prepared by respectively connecting the neutral point sides of the fifth, eighth, and 13$^{th}$ segments 22 and the U-phase terminal sides of the 6$^{th}$, 9$^{th}$, and 14$^{th}$ segments. U2 phase winding wire is prepared by connecting the fifth to eighth unit coils 21 in series that are prepared by respectively connecting the neutral point sides of the 21$^{st}$, 24$^{th}$, and 29$^{th}$ segments 22 and the U-phase terminal sides of the 22$^{nd}$, 25$^{th}$, and 30$^{th}$ segments 22. U3 phase winding wire is prepared by connecting the ninth to 12th unit coils 21 in series that are prepared by respectively connecting the neutral point sides of the 37$^{th}$, 40$^{th}$, and 45$^{th}$ segments 22 and the U-phase terminal sides of the 38$^{th}$, 41$^{st}$, and 46$^{th}$ segments. U4 phase winding wire is prepared by connecting the 13$^{th}$ to 16$^{th}$ unit coils 21 in series that are prepared by respectively connecting the neutral point sides of the 53$^{rd}$, 56$^{th}$, and 61$^{st}$ segments 22 and the U-phase terminal sides of the 54$^{th}$, 57$^{th}$, and 62$^{nd}$ segments 22. It is possible to prepare a U-phase winding wire, in which U1 to U4 phase winding wires are connected in parallel, by connecting a leg portion on the U-phase terminal side of the first segment 22, a leg portion on the U-phase terminal side of the 17$^{th}$ segment 22, a leg portion on the U-phase terminal side of the 33$^{rd}$ segment 22, and a leg portion on the U-phase terminal side of the 49$^{th}$ segment 22, and by connecting a leg portion on the neutral point N side of the 16$^{th}$ segment 22, a leg portion on the neutral point N side of the 32$^{nd}$ segment 22, a leg portion on the neutral point N side of the 48$^{th}$ segment 22, and a leg portion on the neutral point N side of the 64$^{th}$ segment 22.

Figure 6:
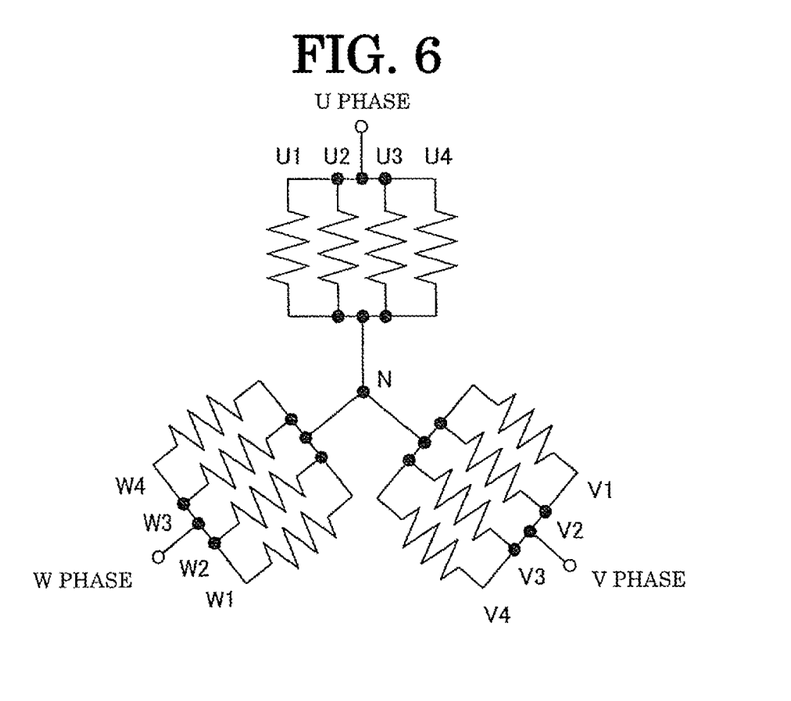
FIG. 6 is a connection diagram in the case of connecting the partial winding wire of each phase in parallel.

Similarly, as shown in FIG. 6, a V-phase winding wire is prepared by connecting V1 to V4 phase winding wires in parallel, and a W-phase winding wire is prepared by connecting W1 to W4 phase winding wires in parallel. It is possible to form the stator coil into a parallel winding wire structure by a Y connection of the U-phase winding wire, the V-phase winding wire, and the W-phase winding wire.

According to the above-configured rotary machine's stator according to the present embodiment, the unit coil 21 is formed by alternately and concentrically arranging the segments 22 with a plurality of slot pitches that are different from each other. This makes it possible to arrange the first segment 22A on the inner side in the axial direction of the second segment 22B. As compared with conventional unit coils, it is possible to form the unit coil 21 by making the segments 22 dense. This makes it possible to decrease the coil end size. Furthermore, in the case of directly cooling the coil ends with liquid, it becomes possible to sufficiently spread coolant throughout the coil ends due to making the segments 22 dense, thereby improving the cooling effect.

Furthermore, it becomes possible by the rotary machine's stator according to the present embodiment to select (switch) series wiring or parallel wiring by changing the connection relation of each unit coil 21, even if the arrangement of the segments 22 is the same. Therefore, it becomes possible to easily change terminal voltage of the rotary machine, thereby improving convenience. Furthermore, even in the case of making it into a parallel wiring structure, it is possible to prevent the occurrence of circulating current.

The present invention is not limited to the above-mentioned embodiment. According to need, it is possible to set the number of unit coils 21 for constituting the winding wire of each phase, the number of the segments 22 for constituting the unit coil 21, the slot pitch of the segment 22, etc. to the extent not deviating from the gist of the present invention.

EXPLANATION OF SIGNS

10: rotary machine stator
12: stator core
14: slot
20: U-phase winding wire
21: unit coil
22: segment
22A: first segment
22B: second segment

The invention claimed is:
1. A stator of a rotary machine, comprising:
a stator core having a plurality of slots provided along a circumferential direction;
segments that are composed of rectangular wires and received in the slots; and
a distributed winding wire that is formed by arranging unit coils in the circumferential direction of the stator core, each unit coil being made up of a plurality of the segments including a first segment having a first slot pitch and a second segment having a second slot pitch that is greater than the first slot pitch,
wherein each unit coil is formed by connecting the first segment and the second segment that are alternately and concentrically arranged in a radial direction of the stator core.
2. The stator of the rotary machine as claimed in claim 1, wherein unit winding wires of each phase, each unit winding wire being prepared by connecting in series the unit coils by a number of n in the circumferential direction of the stator core, are connected in series.
3. The stator of the rotary machine as claimed in claim 1, wherein unit winding wires of each phase, each unit winding wire being prepared by connecting in series the unit coils by a number of n/2 in the circumferential direction of the stator core, are connected in parallel.
4. The stator of the rotary machine as claimed in claim 1, wherein the segment is formed into a hairpin shape by bending both ends of a single rectangular wire, and both ends are inserted into the slots that are different from each other, wherein a tip end portion of one of the segments that is bent to project from the stator core is connected to the tip end portion or a phase terminal or a neutral point of another of the segments.

5. A stator of a rotary machine comprising:

a stator core having a plurality of slots provided along a circumferential direction;

segments that are composed of rectangular wires and received in the slots; and a distributed winding wire that is formed by arranging unit coils, each of which is made up of a plurality of the segments disposed along a radial direction, in the circumferential direction of the stator core, wherein the unit coil is formed by connecting the segments that are alternately and concentrically arranged in the radial direction with a plurality of slot pitches that are different from each other, wherein the unit coils are arranged by a number of 2n (where n is a natural number of 4 or greater and is an even number) in the circumferential direction of the stator core, wherein the distributed winding wire is formed such that a unit coil at a start of a winding is determined as a first coil and that a unit coil at an end of the winding is determined as a 2nth coil, wherein two of slots for receiving the segments constituting the first coil are identical with two of slots for receiving the segments constituting each of an nth coil, an (n+1)th coil and the 2nth coil, wherein other two of the slots for receiving the segments constituting the first coil are identical with two of the slots for receiving the segments constituting each of a second coil, the (n+1)th coil, and a (n+2)th coil, wherein two of slots for receiving the segments constituting a (1+2i)th coil (where i is a natural number from 1 to (n/2−1)) are identical with two of slots for receiving the segments constituting each of a 2ith coil, an (n+2i)th coil, and an (n+1+2i)th coil, wherein other two of the slots for receiving the segments constituting the (1+2i)th coil are identical with two of slots for receiving the segments constituting each of a (2+2i)th coil, the (n+1+2i)th coil, and an (n+2+2i)th coil.

6. The stator of the rotary machine as claimed in claim 5, wherein the segments include a first segment having a first slot pitch and a second segment having a second slot pitch that is greater than the first slot pitch, wherein each unit coil is formed by alternately and concentrically arranging the first segment and the second segment in the radial direction, wherein a slot for receiving a phase terminal side of the first segment constituting the first coil is identical with a slot for receiving a phase terminal side of each of the second segment constituting the nth coil, the first segment constituting the (n+1)th coil, and the second segment constituting the 2nth coil, wherein a slot for receiving a phase terminal side of the second segment constituting the first coil is identical with a slot for receiving a phase terminal side of each of the first segment constituting the nth coil, the second segment constituting the (n+1)th coil, and the first segment constituting the 2nth coil, wherein a slot for receiving a neutral point side of the first segment constituting the first coil is identical with a slot for receiving a neutral point side of each of the second segment constituting the second coil, the first segment constituting the (n+1)th coil, and the second segment constituting the (n+2)th coil, wherein a slot for receiving a neutral point side of the second segment constituting the first coil is identical with a slot for receiving a neutral point side of each of the first segment constituting the second coil, the second segment constituting the (n+1)th coil, and the first segment constituting the (n+2)th coil, wherein a slot for receiving a phase terminal side of the first segment constituting the (1+2i)th coil is identical with a slot for receiving a phase terminal side of each of the second segment constituting the 2ith coil, the first segment constituting the (n+1+2i)th coil, and the second segment constituting the (n+2i)th coil, wherein a slot for receiving a terminal phase side of the second segment constituting the (1+2i)th coil is identical with a slot for receiving a phase terminal side of each of the first segment constituting the 2ith coil, the second segment constituting the (n+1+2i)th coil, and the first segment constituting the (n+2i)th coil, wherein a slot for receiving a neutral point side of the first segment constituting the (1+2i)th coil is identical with a slot for receiving a neutral point side of each of the second segment constituting the (2+2i)th coil, the first segment constituting the (n+1+2i)th coil, and the second segment constituting the (n+2+2i)th coil, wherein a slot for receiving a neutral point side of the second segment constituting the (1+2i)th coil is identical with a slot for receiving a neutral point side of each of the first segment constituting the (2+2i)th coil, the second segment constituting the (n+1+2i)th coil, and the first segment constituting the (n+2+2i)th coil.

7. The stator of the rotary machine as claimed in claim 5, wherein unit winding wires of each phase, each unit winding wire being prepared by connecting in series the unit coils by a number of n in the circumferential direction of the stator core, are connected in series.

8. The stator of the rotary machine as claimed in claim 5, wherein unit winding wires of each phase, each unit winding wire being prepared by connecting in series the unit coils by a number of n/2 in the circumferential direction of the stator core, are connected in parallel.

9. The stator of the rotary machine as claimed in claim 5, wherein the segment is formed into a hairpin shape by bending both ends of a single rectangular wire, and both ends are inserted into the slots that are different from each other, wherein a tip end portion of one of the segments that is bent to project from the stator core is connected to the tip end portion or a phase terminal or a neutral point of another of the segments.

* * * * *